(No Model.) 10 Sheets—Sheet 1.

P. W. LEFFLER.
ELECTRIC ELEVATOR.

No. 573,820. Patented Dec. 22, 1896.

Fig. 1.

Witnesses:
C. F. Kilgore
A. D. Merchant

By his Attorney
Jas. F. Williamson

Inventor
Paul W. Leffler (No Model.) 10 Sheets—Sheet 3.

P. W. LEFFLER.
ELECTRIC ELEVATOR.

No. 573,820. Patented Dec. 22, 1896.

Witnesses:
C. F. Kilgore
R. D. Merchant

Inventor.
Paul W. Leffler
By his Attorney, Jas. F. Williamson.

(No Model.)　　　　　　P. W. LEFFLER.　　　10 Sheets—Sheet 4.
ELECTRIC ELEVATOR.

No. 573,820.　　　　　　　　　Patented Dec. 22, 1896.

(No Model.) 10 Sheets—Sheet 5.

P. W. LEFFLER.
ELECTRIC ELEVATOR.

No. 573,820. Patented Dec. 22, 1896.

Witnesses:
C. F. Kilgore
R. D. Merchant

Inventor:
Paul W. Leffler
By his Attorney
Jas. F. Williamson

THE NORRIS PETERS CO., PHOTO-LITHO., WASHINGTON, D. C.

(No Model.) 10 Sheets—Sheet 6.

P. W. LEFFLER.
ELECTRIC ELEVATOR.

No. 573,820. Patented Dec. 22, 1896.

Witnesses:
C. F. Kilgore
P. D. Merchant

Inventor:
Paul W. Leffler
By his Attorney,
Jas. F. Williamson.

(No Model.) 10 Sheets—Sheet 9.

P. W. LEFFLER.
ELECTRIC ELEVATOR.

No. 573,820. Patented Dec. 22, 1896.

Fig. 25.

Witnesses:
C. F. Kilgore
D. D. Merchant

By his Attorney.

Inventor:
Paul W. Leffler
Jas. F. Williamson (No Model.) 10 Sheets—Sheet 10.

P. W. LEFFLER.
ELECTRIC ELEVATOR.

No. 573,820. Patented Dec. 22, 1896.

Witnesses:
C. F. Kilgore
R. D. Merchant

Inventor
Paul W. Leffler
By his Attorney
Jas. F. Williamson

THE NORRIS PETERS CO., PHOTO-LITHO., WASHINGTON, D. C.

UNITED STATES PATENT OFFICE.

PAUL W. LEFFLER, OF CHICAGO, ILLINOIS, ASSIGNOR TO THE LEFFLER ELECTRO MAGNETIC RAILWAY COMPANY, OF SAME PLACE.

ELECTRIC ELEVATOR.

SPECIFICATION forming part of Letters Patent No. 573,820, dated December 22, 1896.

Application filed August 19, 1895. Serial No. 559,702. (No model.)

*To all whom it may concern:*

Be it known that I, PAUL W. LEFFLER, a citizen of the United States, residing at Chicago, in the county of Cook and State of Illinois, have invented certain new and useful Improvements in Electric Elevators; and I do hereby declare the following to be a full, clear, and exact description of the invention, such as will enable others skilled in the art to which it appertains to make and use the same.

My invention relates to electric elevators, and has for its object to improve the same, in point of speed, economy, and ease of manipulation.

My present invention involves certain features of the system of magnetic propulsion set forth and claimed by me in my prior patents for electric railways, granted to me of date February 13, 1894, and numbered, respectively, 514,561 and 514,718. In these patents, as will be noted by reference thereto, I employ a magnetic field extending along the line of travel, which is produced by a series of magnets spaced apart from each other, with the adjacent members of opposite polarity, and a non-rotating armature carried by the car in position to be subject to the influence of said field, the electromagnets of which armature are preferably arranged in sets connected up in series and so positioned with respect to each other and the field-magnets that the magnetic forces of attraction and repulsion coöperate to propel the car in a common direction. To control and maintain the proper magnetic relations between the field and the armature magnets, I also employ in said patents, in combination with the above-noted features, automatic pole-changing mechanism applied, preferably, in the circuit connections for the armature-magnets.

In my present invention I organize the above combination, together with certain additional features, into an elevator.

My said elevator will be hereinafter fully described, and the novel features be defined in the claims.

The preferred form of the invention is illustrated in the accompanying drawings, wherein, like letters referring to like parts throughout the several views—

As preferably constructed the elevator-car is provided with a pair of armatures and is mounted to work between a pair of combined fields and guides which coöperate with said armatures to propel the car, and with suitable keepers carried by the car to guide and hold the car to a true-line movement.

The elevator-car may be in appearance of the ordinary cage-like form, and for present purposes it will be sufficient to distinguish its side walls $a$, floor $a'$, top yoke $a^2$, and the bottom yoke or truss-bar $a^3$. The said car is also suspended and counterpoised in the usual way from cable $b$, running from top yoke $a^2$ to a weight, (not shown,) over sheave $b'$, mounted in bearings $b^2$ on the fixed beams $b^3$. The parts on the car for coöperation with the fields and guides will be noted later on. These magnetic fields, as shown, comprise each a channel-shaped core or back bar $c$, provided with a series of projecting pole-pieces $c'$, on which are wound magnetic coils $c^2$. As already intimated, the pole-pieces of the series of magnets thus formed are so wound that adjacent or alternate members bear opposite polarity, as indicated by the signs $+$ and $-$ in Fig. 24. The wiring for these field-magnets will be set forth in detail later on.

The faces of the pole-pieces $c'$ are connected and covered by metallic guide-bars $c^3$, preferably of brass, which are secured thereto by means of screws or otherwise and form continuous smooth faces, which serve as guides for the car.

The outer edges of the back bars $c$ are, as shown, faced with wooden strips $c^4$, with which coöperate safety-clutches carried by the car, in case of accident, as will later more fully appear.

Figure 1:
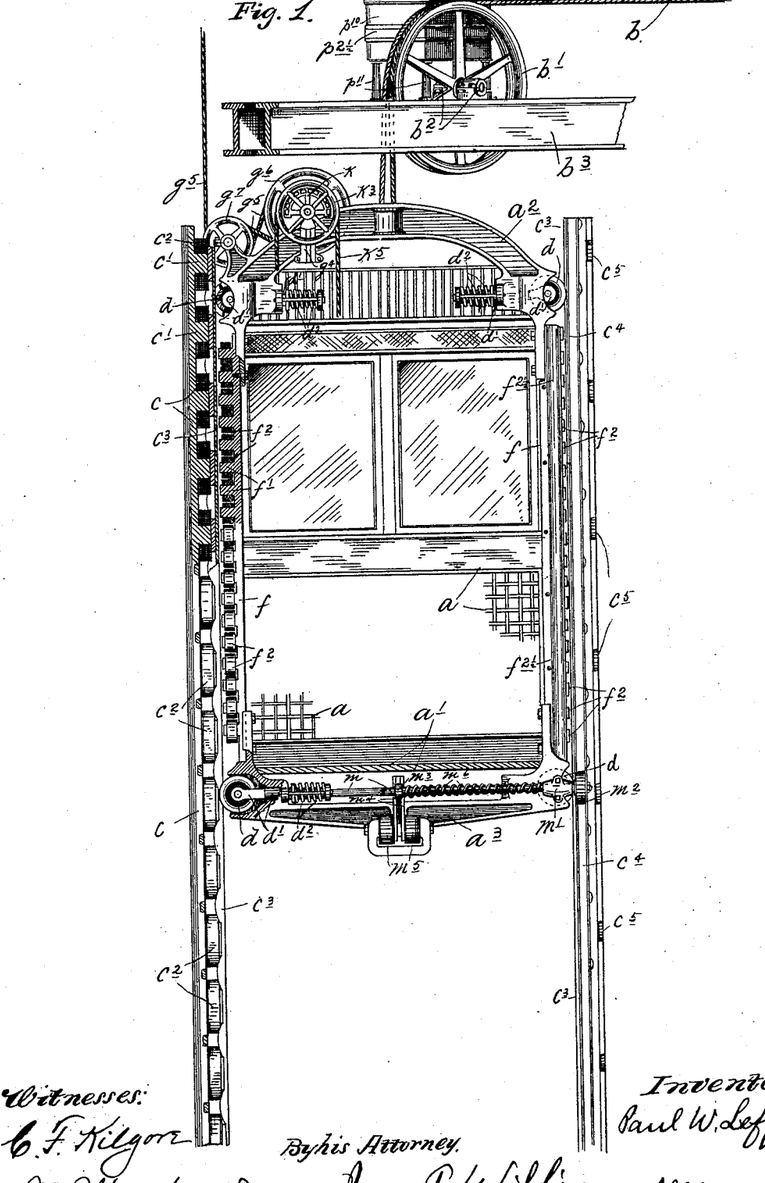
Figure 1 is a view partially in front elevation and partially in vertical section with some parts broken away, showing my improved elevator.
Figure 2:
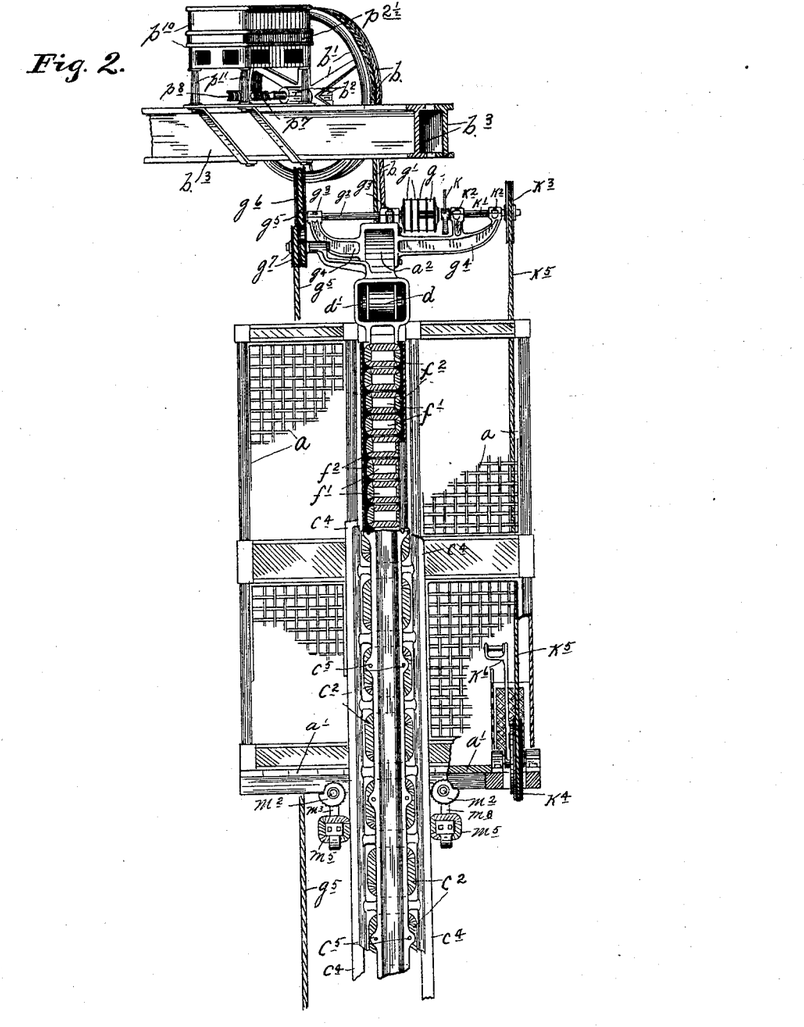
Fig. 2 is a side elevation of the elevator with some parts broken away and some parts shown in section.
Figure 3:
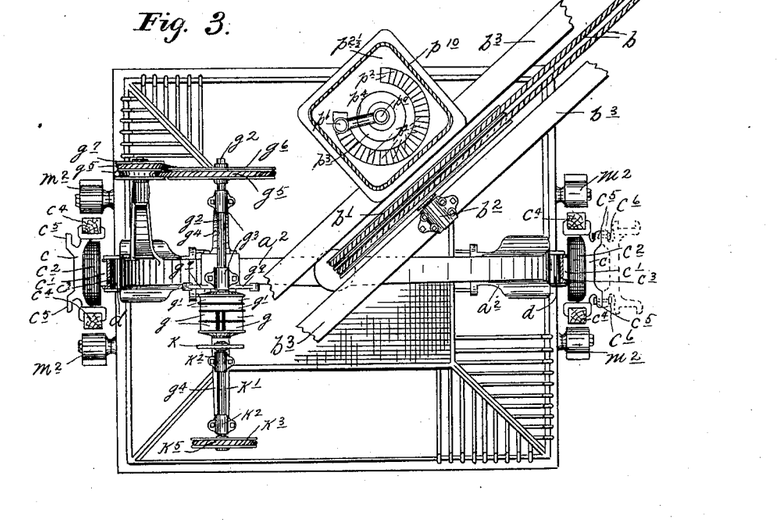
Fig. 3 is a plan view of the elevator, some parts being broken away and others being shown in section.
Figure 4:
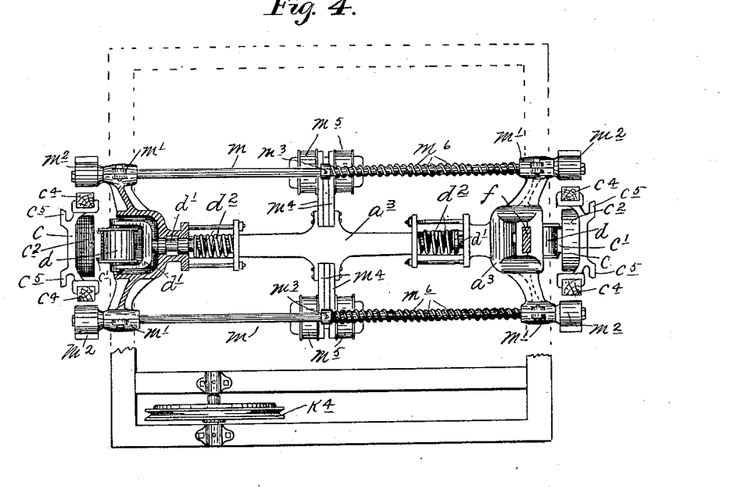
Fig. 4 is a plan view showing the safety-clutch mechanism, &c., carried at the bottom of the car, the main or body portion of said car being partly broken away and partly indicated in outline by dotted lines.
Figure 5:
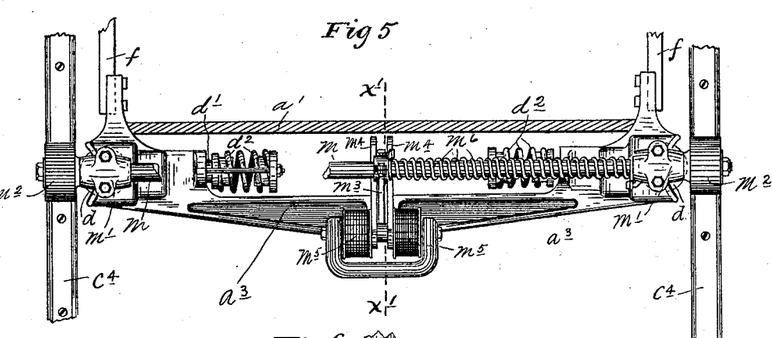
Fig. 5 is a detail view of the safety-clutch carried by the car and its connections, chiefly in front elevation, but partially in section, and some parts being broken away.
Figure 6:
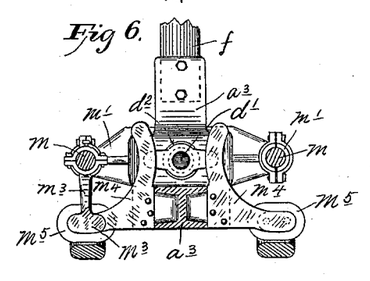
Fig. 6 is a transverse vertical section taken substantially on the line $x'\ x'$ of Fig. 5.
Figure 7:
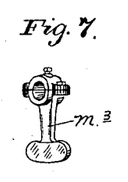
Fig. 7 is a perspective showing one of the pivoted armature-levers of this safety-clutch device removed.
Figure 8:
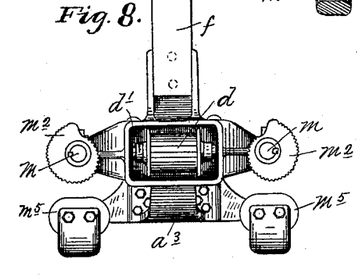
Fig. 8 is a side elevation of the safety-clutch shown in Figs. 5 and 6 with some parts broken away.
Figures 9, 10:
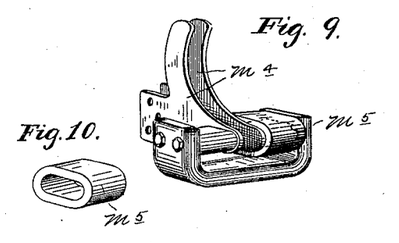
Fig. 9 is a perspective view of the pole-pieces forming part of the safety-clutch.
Fig. 10 is a perspective view of one of the coils of the pole-piece shown in Fig. 9.
Figure 11:
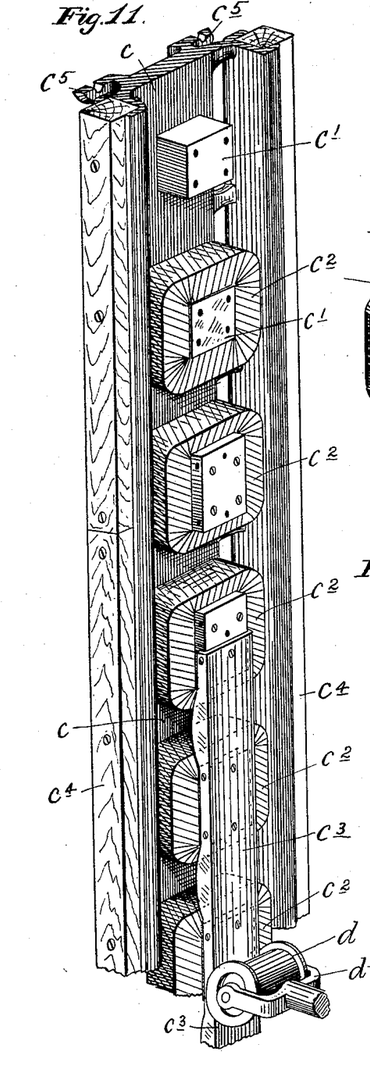
Fig. 11 is a perspective view showing a number of the field-magnets, a section of the core or support to which they are secured, and one of the guide-rollers or keepers of the car in working position thereon, some parts of said field being removed.
Figures 12, 13, 15:
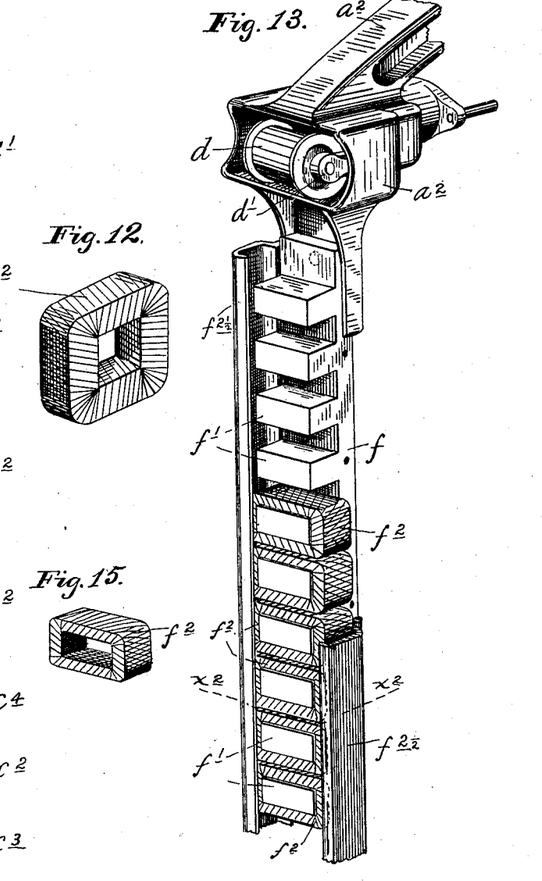
Fig. 12 is a perspective view showing one of the field-magnet coils removed.
Fig. 13 is a perspective view showing a portion of the car-frame and one of the armatures carried by the car, some parts of said armature being removed.
Fig. 15 is a view in perspective, showing one of the coils of one of the armature-magnets removed.
Figure 14:
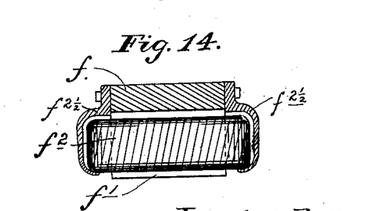
Fig. 14 is a horizontal section through said armature, taken on the line $x^2\ x^2$ of Fig. 13.
Figure 16:
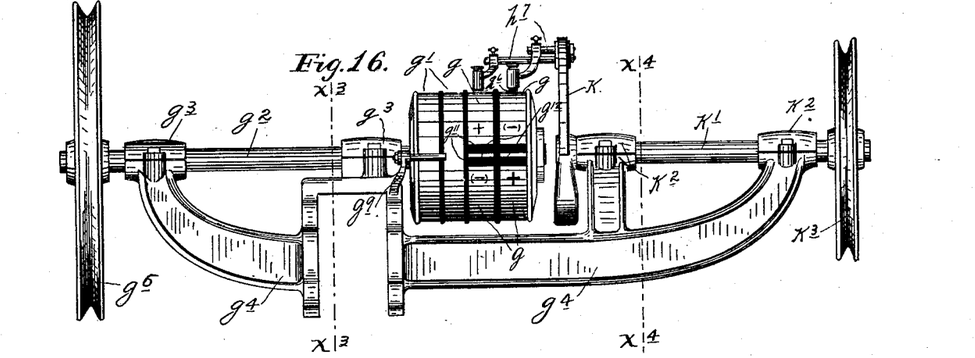
Fig. 16 is a side elevation showing the pole-changing mechanism carried by the car.

The backs of the back bars or field-cores $c$ may be provided with lugs $c^5$, so that in case several elevators are to be set up side by side said cores $c$ may be placed back to back and secured by bolts $c^6$, passed through said lugs, as shown by dotted lines in Fig. 3.

In the construction shown in Figs. 1 to 25, inclusive, the car is held and guided to a true-line movement by means of two pairs of flanged guide or keeper rollers $d$, working over the faces of the guide-bars $c^3$. These rollers $d$ are arranged to work from opposite sides of the car, one pair at the top and the other pair at the bottom of the same, and are carried by sliding yoke-headed plungers $d'$, mounted the upper pair in the ends of the top yoke $a^2$ and the lower pair in the lower yoke or truss-bar $a^3$. Springs $d^2$ are applied to the plungers $d'$, which tend to hold the rollers tightly against the guide-bars $c^3$ and spring-cushion the car in a central position between the fields.

The car-armatures are secured to the opposite sides of the car in position to be subject to the magnetic action of the fields. These armatures comprise each a continuous soft-iron bar or core $f$, having a series of pole-pieces $f'$, which, as shown, are spaced apart one-third of the distance between the field-magnets $c'$ $c^2$ and are wound with coils $f^2$, protected on their sides by guards $f^{2\frac{1}{2}}$. At their upper ends these bars or cores $f$ are secured to depending portions of the top-yoke casting $a^2$ and at their lower ends to upward projections from the bottom yoke $a^3$. The field-magnets $c'$ $c^2$, as hitherto stated, are excited when in circuit with a constant polarity. Hence for the successful operation of my elevator it is necessary to change the polarities of the armature-magnets at such times or at such positions relative to the field-magnets as to cause the proper coöperation between the field and the armature magnets to drive the car in one direction or the other or to cause the car to stand still, as may be desired. Hence my pole-changing mechanism will next be described, attention being first called to the commutator. This commutator is in its main features of construction the same as that set forth and claimed by me in my hereinbefore-identified patent, No. 514,561. It is therefore deemed sufficient for the purposes of this case to note that this commutator is constructed with interlocked double segmental terminal pieces $g$, arranged to form two complete cylinders, which, together with a pair of feed-rings $g'$, are carried by a common shaft $g^2$, mounted in bearings $g^3$ of a bracket $g^4$, secured to the car-yoke $a^2$, and that the wiring and insulations between said parts are such that the laterally-adjacent segments as well as the circumferentially-adjacent segments of the commutator are of opposite polarity, as indicated by $+$ and $-$ signs on Fig. 16 of the drawings. This commutator $g$ $g'$ $g^2$ is revolved according to the speed of the car when the elevator-car is in motion by means of a rope $g^5$, passing over a sheave $g^6$, fixed on the rear end of the commutator-shaft $g^2$, thence over a guide-sheave $g^7$, carried by the rear upper rim of the car, and having both of its ends drawn taut and secured (by means not shown) to the building or other fixed support, with one end above and the other end below the extreme limits of the car's travel.

The electric current is supplied to and conveyed from the feed-rings $g'$ through a pair of insulated contact-brushes $g^8$, supported by arms $g^9$, projecting from the bracket $g^4$ and provided with spring-seated carbon contacts $g^{10}$. The respective feed-rings $g'$ are electrically connected with different sets of the commutator segments $g$, which sets are insulated from each other, and hence when the proper connections are made to the car-armature magnets $f'$ $f^2$ the current from one of the feed-rings $g'$ will pass through the armature-magnet coils $f^2$ before it can return to the other members of said feed-rings $g'$.

Figures 17, 18, 19, 20, 21:
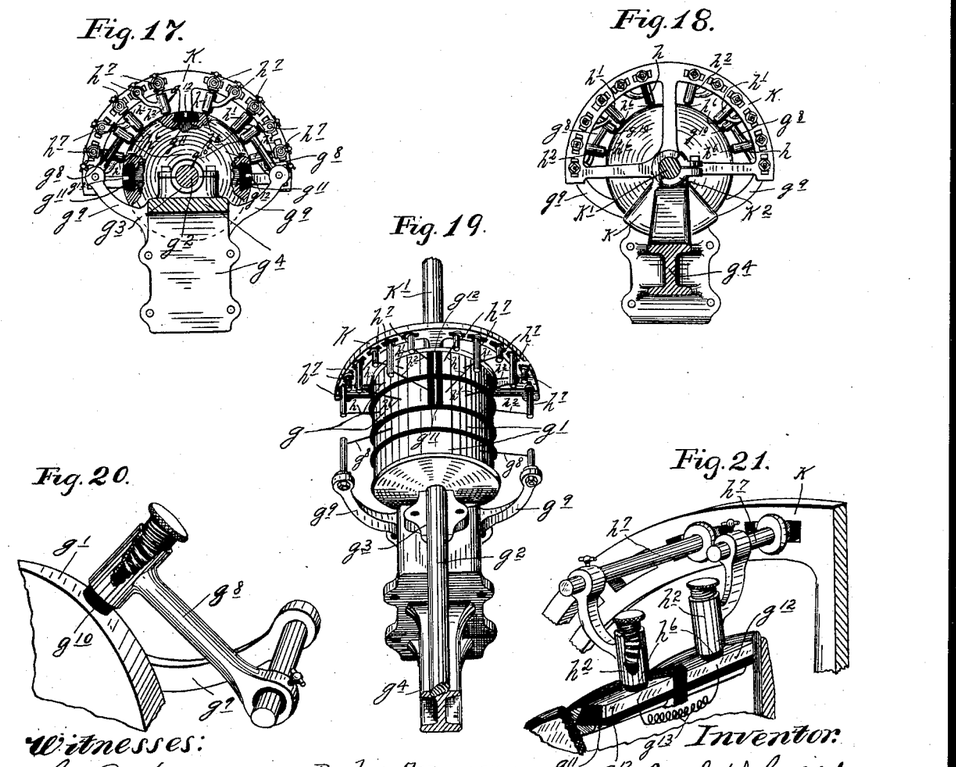
Fig. 17 is a vertical transverse section taken on the line $x^3 x^3$ of Fig. 16, looking toward the right.
Fig. 18 is a vertical transverse section taken on the line $x^4\ x^4$ of Fig. 16, looking toward the left.
Fig. 19 is a bird's-eye perspective of the pole-changing mechanism shown in Fig. 16, some parts being broken away and others removed.
Fig. 20 is a perspective view showing one of the feed-brushes and feed-rings of the pole-changing mechanism, some parts being broken away.
Fig. 21 is a perspective view, partially in section and with some parts broken away, showing a pair of the pole-changing brushes, their support, and a portion of the commutator of the pole-changer.
Figure 22:
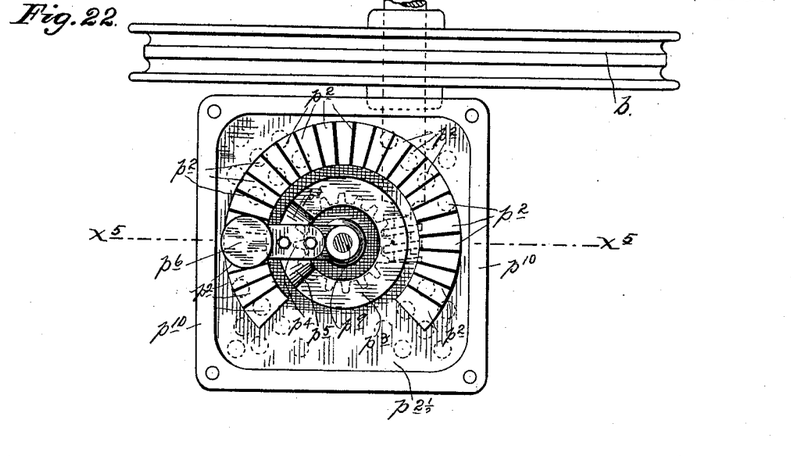
Fig. 22 is a plan view of a portion of the switch for the sections of the field-magnets.
Figure 23:
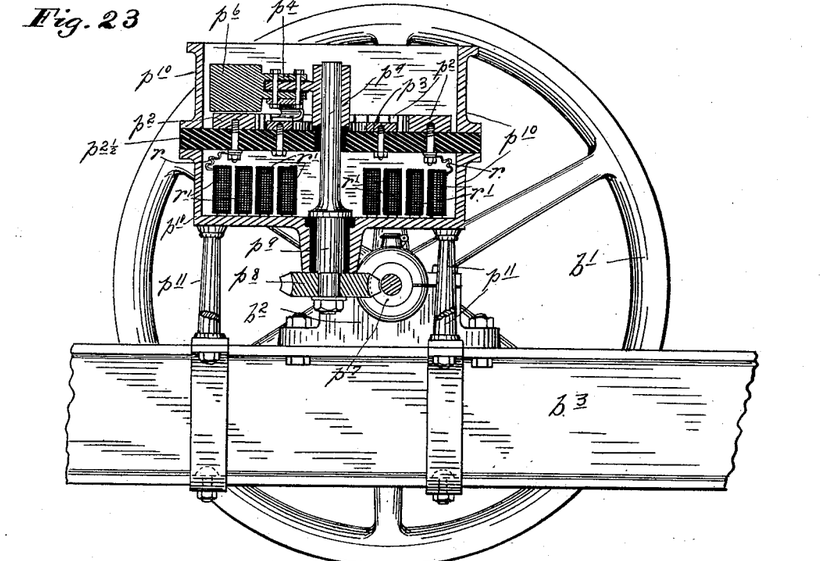
Fig. 23 is a vertical transverse section taken on the line $x^5$ $x^5$ of Fig. 22.

The lateral insulation $g^{11}$, between the commutator-segments $g$, are provided with metal conducting-strips $g^{12}$, the laterally-opposite pairs of which are connected by short circuit wires or coils $g^{13}$, as shown in Fig. 21, to avoid sparking when the brushes pass from one segment to another.

The magnets of each car-armature are connected up in three sets or series, each of which series is fed from the commutator through separate pairs of brushes $h$ $h'$ $h^2$ (see Figs. 16, 17, 19, 21, and 24) and corresponding circuit connections $h^3$ $h^4$ $h^5$, respectively. Attention is here called to the fact that in Fig. 19 the pairs of brushes $h$ $h'$ $h^2$ are indicated diagrammatically by straight lines. The three circuits to each armature are indicated in the diagram view of Fig. 24 as follows, to wit: the circuit $h^3$ by full lines, the circuit $h^4$ by dotted lines, and the circuit $h^5$ by broken lines.

Figure 24:
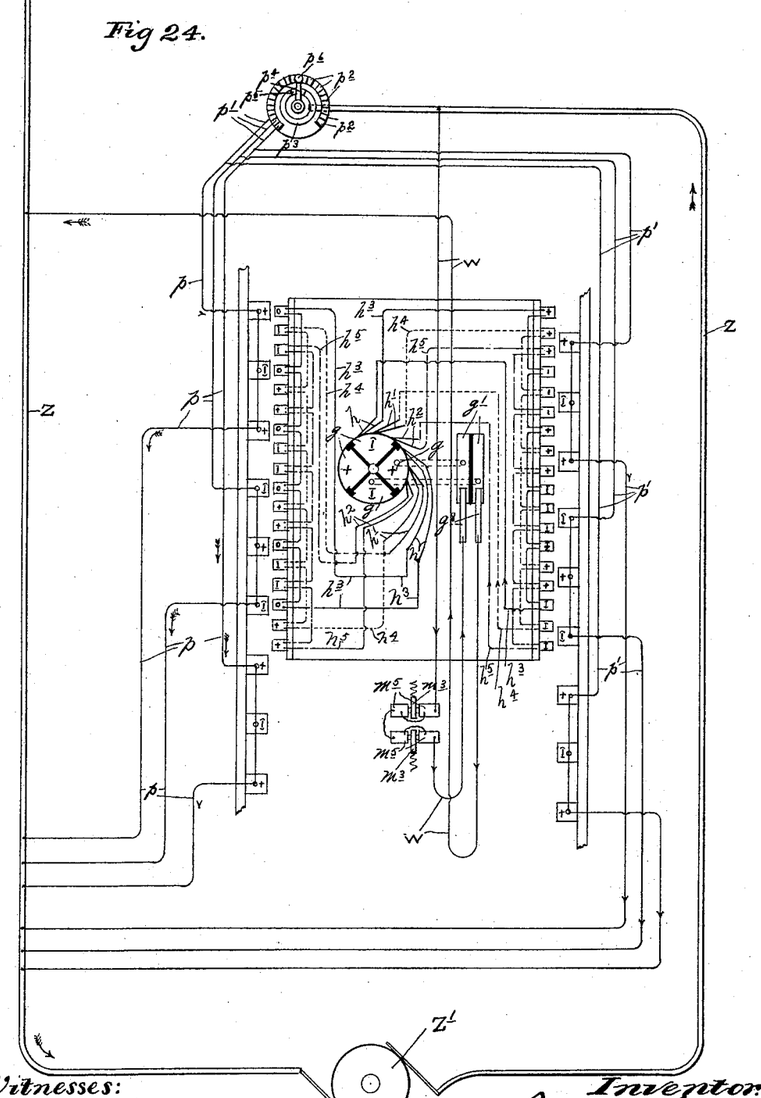
Fig. 24 is a view in diagram, showing the wiring of the field and armature magnets.

It will be observed, by reference to Figs. 19, 21, and 24, that the brushes which constitute pairs are located laterally or axially of the commutator, side by side, with the three pairs of brushes which connect the three serial sets of the magnets of one armature located within one segment of the commutator, while the other corresponding three sets of brushes, which connect the magnets of the other armature, are located within another segment of said commutator. It will be further observed, by reference particularly to Figs. 19 and 24, that the three pairs of brushes which connect the magnets of the one armature are located slightly farther in advance with reference to their engaging armature-segment than are the other three pairs of brushes with reference to their engaging armature-segment. This causes the current alternations and the changes of polarity of the corresponding armature-magnets of the two armatures to take place at slightly different times and renders the magnetic pull on the car steady and free from weak impulses.

The brushes $h$ $h'$ $h^2$ are all provided with spring-mounted carbon contacts $h^6$, the faces of which bear on the periphery of the commutator, and are in face width less than the circumferential width of the lateral insulations $g^{11}$, but of a sufficient face width to span or connect the sections of the commutator with the metallic overstrips $g^{12}$.

The brushes $h$ $h'$ $h^2$ are mounted on rods or pins $h^7$, all of which rods $h^7$ are carried by, but insulated from a common adjusting-sector $k$, secured on a short shaft $k'$, mounted in bearings $k^2$ of the bracket $g^4$. The forward or outer end of the shaft $k'$ has secured thereto a sheave $k^3$. $k^4$ is a loose sheave located in line with the sheave $k^3$ at the lower front portion of the elevator-car. $k^5$ is an endless cable tightly stretched over the sheaves $k^3$ and $k^4$, as shown best in Fig. 2. $k^6$ is a hand-lever of the ordinary form used on elevators, adapted for engagement or disengagement with the sheave $k^4$, and serving to operate the same. Hence either by taking hold of the cable $k^5$ and drawing on the same or by moving said cable by means of the hand-lever $k^6$ the sector $k$ and the commutator-brushes $h$ $h'$ $h^2$ may be moved together to vary their positions on the commutator. As a result of such adjustments of the brushes on the commutator the relative timing of the alternations or changes in polarity of the armature-magnets may be accomplished, or, in other words, the magnets of said armatures may be caused to change their polarity at any desired position relative to the adjacent field-magnets. These time relations of the armature and the field will be further discussed in connection with the description of the operation of the elevator.

Before leaving the detail description of the parts carried on the car attention is called to the safety-clutch device. As shown, this safety-clutch comprises two transverse parallel rock shafts or rods $m$, mounted in bearings $m'$, projecting from the lower yoke $a^3$ and provided at their ends with grip-cams or eccentric friction-blocks $m^2$, which when released engage the wooden facings or strips $c^4$ of the extended field-cores $c$ and stop the downward movement of the car. The rock-shafts $m$ are each provided with a projecting armature-lever $m^3$, each of which levers works between a pair of segmental pole-pieces $m^4$, provided with coils $m^5$. These coils $m^5$ are connected in series into the circuit $w$, leading from the main circuit $z$. As shown, this main circuit $z$ is fed from a dynamo $z'$. (See Fig. 24.) The grip-cams or eccentric blocks $m^2$ are under constant strain to engage and clamp the strips $c^4$ from springs $m^6$, coiled around the rods $m$ with one of their ends secured to said rods and their other ends secured to the fixed bearings $m'$. When the coils $m^5$ of the pole-pieces $m^4$ are energized, which is their normal condition, the free ends of the armature-levers $m^3$ will be drawn, against the strain of the coiled springs $m^6$, into the position shown in Figs. 1, 6, and 8, opposite to said coils $m^5$, in which position the grip-cams $m^2$ will stand clear of said strips $c^4$. Hence the safety-clutch is normally idle, but will become active when by any cause the circuit through the clutch magnet-coils $m^5$ is broken. The relation of the wiring for the clutch with respect to the armature and the field will be stated later on.

Figure 25:
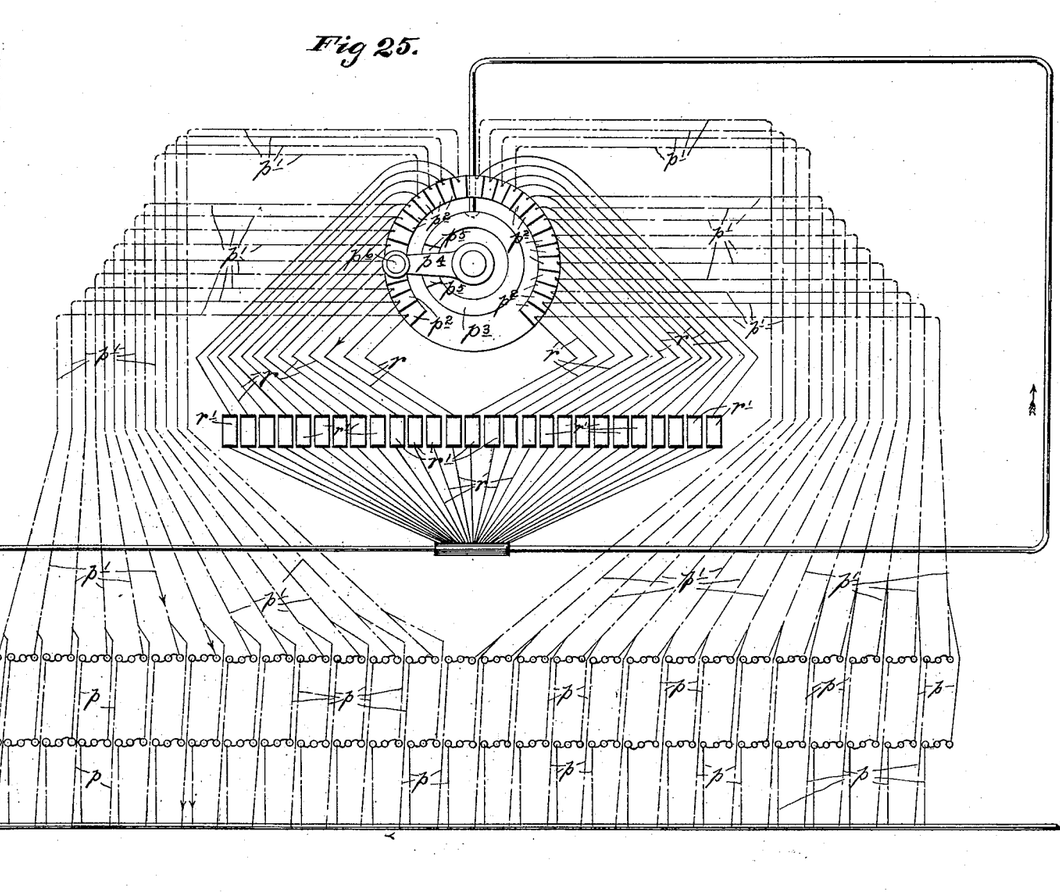
Fig. 25 is a view in diagram, showing the complete wiring of the field-magnets, the switch controlling the same, and a series of resistance-coils in short circuits to said field-wires.

Returning now to the field-magnets and their connections, attention is called to the diagram Figs. 24 and 25, by reference to which it may be seen that the field-magnets are connected by means of wires $p$ into sets, which, as shown, are formed each by three adjacent magnets. The corresponding opposite sets of these field-magnets are connected together for simultaneous impulses by means of wires $p'$. By reference to Fig. 25 it will be seen that each field is thus connected up throughout its entire length into sections comprising three magnets each.

To control the sets of the field-magnets, I provide an automatic switch, which is operated according to the speed of the car, and which is adapted to keep closed the circuits through those sets, of the field, which stand opposite, or nearly opposite, to the car-armatures. This switch is shown best in Figs. 1, 3, 22, 23, 24, and 25. As shown, the said switch comprises a series of contacts $p^2$, corresponding in number to the number of sets of magnets in each field or the total number of double or connected sets in the two fields, with said contacts in circular arrangements on an insulating-plate $p^{24}$, a feed-ring $p^3$, connected to one of the main feed-wires $z$, and a pivoted switch-lever $p^4$, having a contact or brush $p^5$, engaging continuously with said feed-ring $p^3$, and a contact-head $p^6$, engaging over said contact-pieces $p^2$. This contact-head $p^6$ is wide enough to span or connect at one time three adjacent contact-pieces $p^2$. Hence under the movement of the car three sets of the field-magnets will always be rendered active on each of the car-armatures. The switch-lever $p^4$ is moved according to the speed of the car by means of a worm $p^7$, formed on the shaft of the large sheave $b'$, over which the car-suspending cable $b$ passes, and a worm-gear $p^8$, fixed on the shaft $p^9$ of said switch-lever $p^4$ and engaged by said worm $p^7$, as shown best in Figs. 22 and 23. As shown in the drawings, this switch is incased and supported by a box-like support $p^{10}$, secured by means of legs $p^{11}$ to the tops of the fixed beams $b^3$.

To prevent sparking under the action of closing and opening the circuits through the various sections of the field-magnets, I connect each of the contact-pieces $p^2$ with the main conductor $z$ through one of a series of shunt-circuit wires $r$, provided each with resistance-coils $r'$. With this arrangement the circuits between the main conductor $z$ and the sets of field-magnets are never broken, but the current is simply shifted from the resistance-coils $r'$ and wires $r$ to the relatively low-resistance circuit through the contacts $p^2$, feed-ring $p^3$, and lever $p^4$. However, the resistance of said resistance-coils $r'$ is so high that while they will pass sufficient current under an impulse caused by breaking the circuit at the switch to prevent sparking they will resist any operative flow, while the current can find a circuit through said feed-ring $p^3$ and lever $p^4$ under normal conditions. As shown in the drawings, these resistance-coils $r'$ are located within a lower compartment of the case or support $p^{10}$, as shown best in Fig. 23.

Operation: It will be understood, of course, that to obtain the most powerful propelling action between the field and the armature magnets the polarities of the armature-magnets should be changed just as they pass the centers of the field-magnets, while by changing the polarities of said armature-magnets at points just midway between said field-magnets the forces of attraction and repulsion would neutralize each other and have no tendency to move the car in either direction. With the wiring and pole-changing mechanism above set forth the polarities of the armature-magnets may be changed at such times or at such positions relative to the field-magnets as will give to the car the desired power and speed, and the power may be applied to propel the car in either direction. For example, to cause the car to travel upward the brushes $h$ $h'$ $h^2$ would be positioned so as to give substantially the relative timing between the armature and the field-magnets. (Shown in Fig. 24.) By reference to this diagram, Fig. 24, it will be observed that the magnets of the opposite armatures bear slightly different time relations to their coöperating field-magnets, which, as already indicated, cause the alternations of the polarities of the corresponding magnets of the opposite armatures at slightly different times, thus preventing weak impulses and giving a steady pull on the car. In case the load on the car is greater than the weight of the counterweight suspending the car it will only be necessary, in order to cause the car to descend, to move the brushes $h$ $h'$ $h^2$ into such positions that the upward pull of the fields on the armatures will be reduced below the amount required to suspend the load of the car. If, however, the load on the car is less than the weight of the car's counterweight, the brushes $h$ $h'$ $h^2$ must be moved so that they will at the interval illustrated in Fig. 24 engage the next adjacent segment of the commutator. This adjustment causes the armature-magnets to bear polarities just the reverse from those illustrated in Fig. 24, which of course gives a reverse pull between the field-magnets and the car-armatures. As the car is moved, either upward or downward, the lever $p^4$ of the field-switch $p^2$ $p^3$ $p^4$ is moved according to the speed of the car, as already set forth, keeping in circuit three adjacent field-sections or nine field-magnets on each side of the car and cutting out all of the other sections of the fields.

The action of the safety-clutch has already been given.

From a further inspection of the diagramsheet Fig. 24 it will be seen that whenever the current is flowing through the main or feed wires $z$ the field-section will be energized through branch wires $p$ $p'$, and the armature-sections, together with the safety-clutch magnets, will be energized through the branch wires $w$, and the safety-clutch will be held in its idle position. Hence if the supply of the current is stopped at the source or the circuit be broken in the feed-wires $z$ or in the branch wires $w$ the safety-clutch magnet will be deënergized and the safety-clutch rendered active under the tension of the clutch-springs to prevent the falling of the car.

In respect to the motion of the elevator-car it should be noted that by the proper manipulation of the pole-changing mechanism with the hand-lever $k^6$ or rope $k^5$ the car can be readily stopped or started in any position without shock or jar, inasmuch as the magnetic forces will act with a yielding or cushioning effect on the car.

Figure 26:
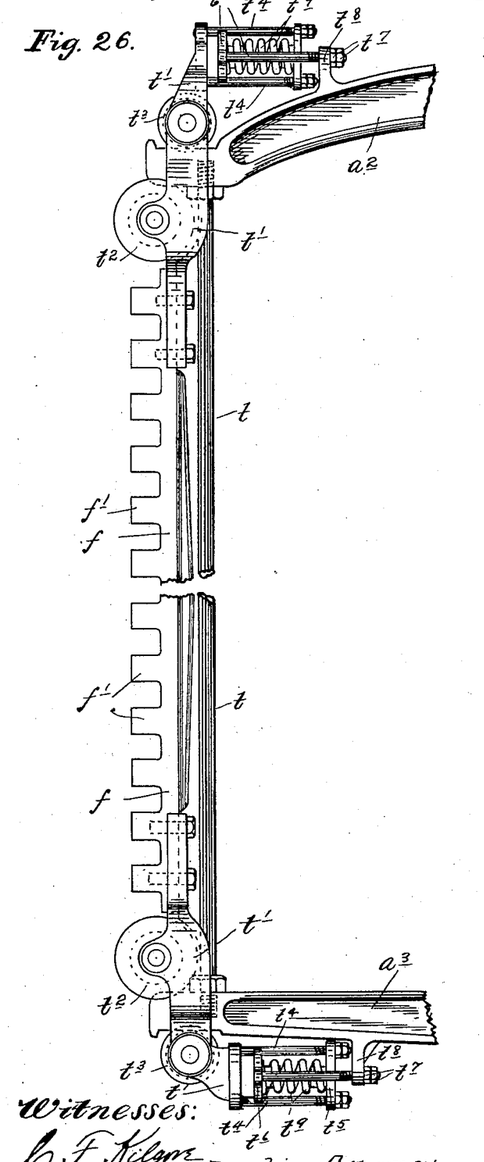
Figs. 26 and 27 are views, respectively, in front and side elevation, illustrating my preferred construction of elevator-car frame, some parts being broken away and others removed.
Figure 27:
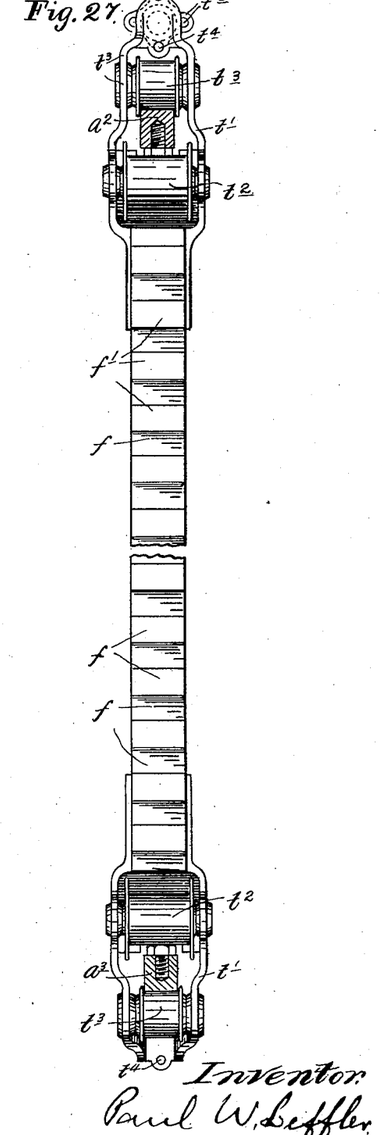

In the construction of the elevator-car illustrated in Figs. 26 and 27 the top yoke $a^2$ and the bottom yoke $a^3$ are connected and tied together at their opposite ends by vertical rods $t$. The armature-cores $f$ $f'$ are mounted with freedom for a slight lateral movement with respect to the car-body. To accomplish this, the armature-cores $f$ $f'$ are secured at each of their ends to bifurcated brackets $t'$, in which are mounted the flanged guide-wheels or keeper-rolls $t^2$, adapted for engagement with the guide-bars $c^3$ of the fields. These brackets $t'$ have also antifriction-rolls $t^3$, which engage one pair with the upper end surfaces of the top yoke $a^2$ and the other pair the bottom yoke $a^3$. The extended ends of these brackets $t'$ are provided with inwardly-projecting guide-rods $t^4$, connected at their inner ends by the bars $t^5$. $t^6$ are cross-heads working on the guide-rods $t^4$ and having their stem portions secured by means of nuts $t^7$ to lugs $t^8$, projecting from the yokes $a^2$ and $a^3$. $t^9$ are springs coiled around the stems of the cross-heads $t^6$ and compressed between said cross-heads $t^6$ and the tie-bars $t^5$. With this construction the armatures carried by the car are held, in opposition to the attraction of the fields, out of contact with said fields by the guide-rolls $t^2$ and are permitted to follow closely and conform to any unevenness of the field-guides without interference with the lateral movement of the car. When the fields or the armature-magnets are deënergized, the armatures will be slightly retracted or drawn from their extreme outward positions by the springs $t^9$.

What I claim, and desire to secure by Letters Patent of the United States, is as follows:

1. In an elevator, the combination with the car provided with an armature, of combined magnetic-field-producing devices and guide extending along the line of travel, for coöperation with said armature and car, to propel and guide the same, substantially as described.

2. In an elevator, the combination with a pair of armatures carried on the car, of a double row of combined magnetic-field-producing devices and guides extending along the line of travel, for coöperation with said armatures and car, substantially as described.

3. In an elevator, the combination with the double row of combined magnetic-field devices and guides extending along the line of travel, of the car having the pair of magnetic armatures and guide-rollers coöperating with said combined field devices and guides, substantially as described.

4. In an electric elevator, the combination with the double row of magnetic-field devices having the continuous guide-surfaces, of the car provided with the magnetic armatures, coöperating with said field-magnets, and the spring-mounted guide-rollers, engaging said guide-surfaces, substantially as and for the purposes set forth.

5. In an electric elevator, the combination with the pair of channel-shaped field-cores, having the pole-pieces formed integral therewith, the alternate members of which pole-pieces are wound to give opposite polarities, and the continuous metal guide-bars on said magnets, of the car provided with the pair of non-rotating magnetic armatures, coöperating with said fields, and the spring-mounted guide-rollers carried by the car, and engageable with said guide-bars, substantially as described.

6. In an elevator, the combination with the car, of the double row of magnetic-field devices, the pair of magnetic armatures carried by the car, electric connections for said field devices and armatures, and an automatic pole-changer in the armature connections, comprising a commutator operated according to the speed of the car, and two groups of brushes, one group for each armature, said groups being positioned in pairs, one in advance of the other, for engagement with different segments of the commutator, substantially as described.

7. In an elevator, the combination with the car, of the double row of magnetic-field devices in the line of travel, the pair of armatures carried by the car, electric connections for said fields and armatures, and an automatic pole-changer in said armature connections, comprising a commutator operated according to the speed of the car, and two groups of brushes, one group for each armature, fixed for a common adjustment over the face of said commutator, and set with reference to each other, so as to cause the alternations of corresponding magnets of the opposite armatures, at different times, substantially as described.

8. In an elevator, the combination with the car, of the double row of field devices in the line of travel, the pair of magnetic armatures carried by the car, electric connections for said field devices and armature-magnets, an automatic pole-changer in said armature connections, comprising the commutator operated according to the speed of the car, and the two groups of brushes, carried by a common segment, pivoted at the axial center of said commutator, and a hand device for adjusting said segment, extending to within reach of the operator of the car, substantially as described.

9. The combination with a magnetic-field-producing device, extending along the line of travel, of the car provided with the magnetic armature, electric connections for said field device and armature, automatic pole-changing mechanism for said armature connections, comprising the commutator-brushes, the commutator and drive-sheave on a common shaft, and the drive-rope working around said drive-sheave and secured at its ends against endwise movement, substantially as described.

10. In a pole-changer, the combination with the several pairs of brushes located, one pair in advance of the other and secured to a common adjustable segment, of the insulated commutator-sections, and the conductive strips in the lateral insulations of said commutator, electrically connected, to short-circuit said brushes in passing said insulations, substantially as described.

11. In an elevator, the combination with the car, of an armature carried by the car, a magnetic-field-producing device extending along the line of travel, electric connections to said field and armature magnets, a safety-clutch carried by the car, under strain to stop the movement of said car, and an electromagnet energized from said electric connections to said field and armature magnets, whereby, when said connections are energized, said safety-clutch will be held out of action, substantially as and for the purposes set forth.

12. In an electric elevator, the combination with the car, of a magnetic armature carried by the car, magnetic-field devices extending along the line of travel, and having clutch-engaging surfaces, the pair of spring-mounted rock-shafts, carried by the car, having the grip-cams, engageable with this clutch-surface of said field, an armature-lever on said rock-shafts, an electromagnet acting on said armature-lever to hold said grip-cams out of action, and electric connections for energizing said clutch-magnets, fields, and armatures, substantially as described.

13. In an electric elevator, the combination with the car, of the armatures carried by the car, the double row of field devices extending along the line of travel, and having the clutch-engaging surfaces, the pair of spring-mounted rock-shafts carried by the car and having the grip-cams or eccentric blocks, engageable with the clutch-surfaces of said fields, the armature-levers on said rock-shafts, the electromagnets, acting on said armature-levers to hold said grip-cams out of action, and electric connections for energizing said clutch-magnets, fields and armatures, from a common source, substantially as described.

14. The combination with the car or other traveling body, of a supply-conductor, a field formed by a series of electromagnets wired in sets, a common switch in said supply-conductor operated according to the speed of the car, and independent connections from each of said sets of field-magnets to said common switch, whereby, under the movement of the car the circuits through said sets of field-magnets will be successively closed and opened by said common switch, substantially as described.

15. The combination with the car or other traveling body, a supply-conductor, a field formed by a series of electromagnets wired in sets, a common switch in said supply-conductor operated according to the speed of the car and arranged to close the circuits through several of said sets, at one time, and independent connections from each of said sets of field-magnets to said common switch, whereby, under the movement of the car the circuits through said sets of field-magnets will be successively closed and opened by said common switch, substantially as described.

16. The combination, with the car or other traveling body, of the double row of field-magnets, wired in sets, with corresponding sets of each row connected together, a common switch operated according to the speed of the car, and electric connections from each double set of field-magnets arranged to close the circuits through several of said double sets, at one time, and to successively close and open the same under the movement of the car, substantially as described.

17. The combination, with the car, of the field formed by a series of electromagnets, wired in sets, and a switch, operated according to the speed of the car, comprising the feed-ring connected to the source of energy, the series of insulated contact-pieces connected, one to each of the field-circuits, and the pivoted switch-lever working over said feed-ring and contact-pieces, substantially as described.

18. The combination with the field formed by a series of electromagnets, wired in sets, of the switch, comprising the feed-ring, connected to the source of energy, the series of insulated contact-pieces, connected, one to each of the field-circuits, the pivoted switch-lever working over said feed-ring and contact-pieces, and provided with the worm-gear, and the worm, engaging said worm-gear, driven from and operated according to the speed of the car, substantially as described.

19. The combination with the field formed by a series of electromagnets, wired in sets, of the sheave or pulley, mounted on a stationary support, above said fields, the car provided with a magnetic armature and having a cable passing over said sheave, the worm rotating with said sheave, the series of insulated contact-pieces, the feed-ring, and the pivoted switch-lever working over said feed-ring and contact-pieces, and provided with the worm-wheel engaging said worm, substantially as described.

20. The combination with a supply-conductor, of a series of field-magnets, a switch connected to said supply-conductor, a series of wires from certain of said field-magnets to a common switch, and resistance-coils in branch or shunt connections between said field-wires and said supply-conductor, whereby the circuits through said field-magnets are never broken from said supply-conductor and sparking is thereby prevented, substantially as described.

21. The combination with the supply-conductor, of a series of field-magnets, a switch, comprising a series of insulated contact-pieces, each of which is connected to certain of said field-magnets, and a conducting-arm, which is connected to said supply-conductor; and a series of resistance-coils in branch or shunt circuits between said contact-pieces and said supply-conductor, substantially as described.

22. The combination with the double row of field-magnets connected in double sets, of the supply-conductor, the circularly-arranged insulated contact-pieces, each of which is connected to one of the field-circuits, the feed-ring connected to said supply-circuit, the pivoted lever, engaging said feed-ring and contact-pieces, and the series of resistance-coils in branch or shunt circuits between said contact-pieces and said supply-conductor, substantially as described.

23. In an elevator, the combination with the magnetic-field devices extending along the line of travel, of the car provided with armatures, which are spring-mounted for lateral movement, to and from the car, substantially as and for purpose set forth.

24. The combination with the pair of combined magnetic-field devices and guides, extending along the line of travel, of the car-frame, the pair of armatures mounted for movement, to and from said car-frame, and provided with guide or keeper rolls, engageable with the guides of said fields, and spring connections between said armatures and said car-frame, tending to retract said armatures from said fields, substantially as described.

In testimony whereof I affix my signature in presence of two witnesses.

PAUL W. LEFFLER.

Witnesses:
HARRIETT M. SMITH,
WILLIAM THOMPSON.